United States Patent
Suzuki et al.

(10) Patent No.: US 10,145,323 B2
(45) Date of Patent: Dec. 4, 2018

(54) STARTING CONTROL DEVICE FOR ENGINE

(71) Applicants: TOYOTA JIDOSHA KABUSHIKI KAISHA, Toyota-shi (JP); DENSO TEN Limited, Kobe-shi (JP)

(72) Inventors: Yusuke Suzuki, Hadano (JP); Kunihiko Usui, Fuji (JP); Kazuya Koyama, Kobe (JP)

(73) Assignees: TOYOTA JIDOSHA KABUSHIKI KAISHA, Toyota-shi (JP); DENSO TEN Limited, Kobe-shi (JP)

(*) Notice: Subject to any disclaimer, the term of this patent is extended or adjusted under 35 U.S.C. 154(b) by 0 days.

(21) Appl. No.: 15/843,537

(22) Filed: Dec. 15, 2017

(65) Prior Publication Data

US 2018/0171915 A1     Jun. 21, 2018

(30) Foreign Application Priority Data

Dec. 15, 2016 (JP) ................................. 2016-243364

(51) Int. Cl.
 *F02D 41/06* (2006.01)
 *F02D 41/30* (2006.01)
 (Continued)

(52) U.S. Cl.
 CPC ......... *F02D 41/065* (2013.01); *F02D 35/023* (2013.01); *F02D 41/3005* (2013.01);
 (Continued)

(58) Field of Classification Search
 CPC ...... F02D 41/06; F02D 41/065; F02D 35/023; F02D 41/3005; F02N 11/0844;
 (Continued)

(56) References Cited

U.S. PATENT DOCUMENTS 7,191,746 B2 *  3/2007  Nakamura .......... F01L 13/0026
                                                          123/179.18
9,347,392 B2 *  5/2016  Lee ....................... F02D 41/042
 (Continued)

FOREIGN PATENT DOCUMENTS

JP     2006-283671     10/2006
JP     2010-31834      2/2010
 (Continued)

*Primary Examiner* — Hieu T Vo
(74) *Attorney, Agent, or Firm* — Oblon, McClelland, Maier & Newstadt, L.L.P.

(57) ABSTRACT

A starting control device for an engine includes an ECU configured to: i) execute an autonomous starting control in which the ECU injects fuel into the cylinder from a fuel injection valve after a crank shaft rotates reversely before the crank shaft stops its rotation and then ignites an air-fuel mixture using an ignition plug to start the engine without using a starter motor; ii) determine whether a pressure in the cylinder increasing due to the reverse rotation is equal to or greater than a predetermined pressure at a time point of firing of the air-fuel mixture by the ignition; and iii) prohibit starting of the engine under the autonomous starting control when the ECU determines that the pressure in the cylinder is not equal to or greater than the predetermined pressure.

10 Claims, 10 Drawing Sheets

(51) Int. Cl.
*F02D 35/02* (2006.01)
*F02N 11/08* (2006.01)
*F02N 99/00* (2010.01)

(52) U.S. Cl.
CPC ........ *F02N 11/0844* (2013.01); *F02N 99/006* (2013.01); *F02N 2200/022* (2013.01); *F02N 2250/04* (2013.01); *F02N 2300/2002* (2013.01)

(58) Field of Classification Search
CPC ............. F02N 99/006; F02N 2200/022; F02N 2250/04; F02N 2300/2002
See application file for complete search history.

(56) References Cited

U.S. PATENT DOCUMENTS

| | | |
|---|---|---|
| 2010/0000487 A1 | 1/2010 | Hoshino et al. |
| 2013/0319361 A1 | 12/2013 | Furuishi et al. |

FOREIGN PATENT DOCUMENTS

| | | |
|---|---|---|
| JP | 2011-157946 | 8/2011 |
| JP | 2016-136015 | 7/2016 |
| WO | WO 2012/111147 A1 | 8/2012 |

\* cited by examiner

STARTING CONTROL DEVICE FOR ENGINE

INCORPORATION BY REFERENCE

The disclosure of Japanese Patent Application No. 2016-243364 filed on Dec. 15, 2016 including the specification, drawings and abstract is incorporated herein by reference in its entirety.

BACKGROUND

1. Technical Field

The disclosure relates to starting control when a restarting condition is satisfied immediately before an engine stops and more particularly to starting control of performing fuel injection and ignition into a cylinder in an expansion stroke after a crank shaft rotates reversely.

2. Description of Related Art

In the related art, a system (a start-stop system) that automatically stops an engine of a vehicle at the time of idling and then automatically restarts the engine is generally known. In such a system, a restarting condition may be satisfied immediately before the engine is automatically stopped. At this time, in order to realize rapid and smooth starting, performing fuel injection and ignition in a cylinder in an expansion stroke (hereinafter also simply referred to as an expansion stroke cylinder) and performing starting without using a starter motor (hereinafter also referred to as autonomous starting) have been proposed.

For example, as described in Japanese Unexamined Patent Application Publication No. 2016-136015 (JP 2016-136015 A), when fuel injection and ignition are stopped to stop the engine, kinetic energy of a crank shaft rotating in an inertial manner decreases slowly and the crank shaft cannot overtake a top dead center in a compression stroke of some cylinders. The crank shaft stops completely after a rebounding period in which the crank shaft stops temporarily before the top dead center, then rotates reversely, and then rotates forward again.

Paying attention to a fact that a piston of an expansion stroke cylinder rises to the top dead center due to the reverse rotation when a restarting condition is satisfied immediately before rotation of the crank shaft stops in this way, fuel is injected into the cylinder when the piston of the cylinder reaches a predetermined position in the vicinity of the top dead center, and an air-fuel mixture which is formed thereby is ignited to apply a rotational force (a combustion torque) to the crank shaft in the engine described in JP 2016-136015 A.

That is, the crank shaft rotates reversely because a large cylinder pressure is applied to the piston in the cylinder in the compression stroke, and a position at which the crank shaft stops temporarily immediately before the reverse rotation (a crank angle position) varies. This is mainly based on a variation in kinetic energy of the crank shaft or the like when the top dead center is last overtaken before the reverse rotation, and is also based on an influence of a variation in an amount of intake air filled in the cylinder in the compression stroke, friction of the engine, or the like.

When the crank shaft rotates reversely in this way, the piston in the expansion stroke cylinder rises to the top dead center and receives a cylinder pressure. Accordingly, the crank shaft stops temporarily before the top dead center and then rotates forward again, but the position at which the piston stops temporarily immediately before the forward re-rotation varies for the same reason as described above.

The piston in the expansion stroke cylinder may not return to the vicinity of the top dead center due to the variation. At this time, since the cylinder pressure is not so high and the combustion torque is likely to decrease, there is concern that starting will fail. In this regard, in the technique according to the related art (JP 2016-136015 A), fuel injection and ignition are performed when a piston of an expansion stroke cylinder returns to a predetermined position in the vicinity of the top dead center, and autonomous starting is stopped and switched to starting using the starter motor when the piston does not return to the predetermined position.

SUMMARY

However, even when it is determined that the piston of the expansion stroke cylinder returns to the predetermined position due to the reverse rotation as in the related art, it may not be sufficient. That is, a standby time (an ignition delay time) for forming an air-fuel mixture is required until fuel is ignited after the fuel is injected into a cylinder. Accordingly, even when fuel is injected at the time at which the piston returns to the predetermined position in the vicinity of the top dead center, the crank shaft may start forward rotation again until the air-fuel mixture is then ignited and may be separated from the top dead center.

When an air-fuel mixture is ignited in a state in which the piston in the expansion stroke cylinder is outside of a predetermined range in the vicinity of the top dead center in this way, autonomous starting may fail for the above-mentioned reason and is switched to starting using the starter motor in such cases. At this time, for example, after rotation of the crank shaft stops and it is determined that starting fails, the starter motor is activated and extra time is required. Accordingly, a driver may have a feeling of slowness in restarting.

In consideration of the above-mentioned circumstances, the disclosure provides a starting control device for an engine that can accurately determine whether autonomous starting can be performed and switch the autonomous starting to starting using a starter motor before the autonomous starting fails, when a restarting condition is satisfied while an engine is stopping.

According to the disclosure, paying attention to an increase in cylinder pressure in an expansion stroke cylinder due to reverse rotation of a crank shaft immediately before an engine stops, the engine is autonomously started when an air-fuel mixture is ignited in a state in which the cylinder pressure is equal to or higher than a predetermined pressure, and autonomous starting is prohibited otherwise.

That is, according to an aspect of the disclosure, there is provided a starting control device for an engine that starts a direct-injection engine by performing fuel injection and ignition in at least an expansion stroke cylinder when a restarting condition is satisfied immediately before the direct-injection engine stops, and the starting control device for an engine includes an ECU. The ECU is configured to execute an autonomous starting control in which the ECU injects fuel into the expansion stroke cylinder from a fuel injection valve after a crank shaft rotates reversely before the crank shaft stops its rotation and ignites an air-fuel mixture using an ignition plug to start the engine without using a starter motor.

The ECU is further configured to determine whether a pressure in the expansion stroke cylinder increasing due to the reverse rotation is equal to or greater than a predetermined pressure at a time point of firing of the air-fuel mixture by the ignition and to prohibit starting of the engine when the determination unit determines that the pressure in the expansion stroke cylinder (a cylinder pressure) is not equal to or greater than the predetermined pressure. As in the example according to the related art (JP 2016-136015 A), the autonomous starting control unit may await fuel injection or the like until a crank angle position of the expansion stroke cylinder is returned to a predetermined range in the vicinity of a top dead center due to reverse rotation.

According to this configuration, when the restarting condition is satisfied while the engine is stopping, the ECU determines whether the cylinder pressure of the expansion stroke cylinder increasing by reverse rotation of the crank shaft is equal to or greater than the predetermined pressure at the time point of firing of an air-fuel mixture. When it is determined that the cylinder pressure is equal to or greater than the predetermined pressure, control of fuel injection and ignition in the expansion stroke cylinder is performed by the ECU and autonomous starting of the engine is possible.

On the other hand, when it is determined that the cylinder pressure of the expansion stroke cylinder is not equal to or greater than the predetermined pressure at the time point of firing of an air-fuel mixture, autonomous starting of the engine by the ECU is prohibited. Accordingly, the autonomous starting can be switched to starting control in which the starter motor is started before the autonomous starting fails and it is thus possible to prevent a driver from having a feeling of slowness in restarting of the engine.

A cylinder pressure sensor may be provided to measure a cylinder pressure of at least one cylinder of the engine, the cylinder pressure at the time point of firing of an air-fuel mixture may be estimated based on an output signal of the cylinder pressure sensor, and it may be determined whether the estimated cylinder pressure is equal to or greater than the predetermined pressure. When the cylinder pressure sensor is not provided, the determination may be performed from various points of view as described below.

For example, when a maximum value of a crank angular velocity during reverse rotation is less than a predetermined value, a power of the reverse rotation is weak and kinetic energy thereof is not so great. Accordingly, a piston in the expansion stroke cylinder cannot sufficiently compress intake air and it can be determined that the cylinder pressure at the time point of firing of an air-fuel mixture is not equal to or greater than the predetermined pressure. In this case, autonomous starting may be prohibited regardless of a time of a starting request.

A crank angle position at the start time of the reverse rotation indicates a power of rotation of the crank shaft (forward rotation in this case). When the crank angle position is not in a predetermined range in the vicinity of a bottom dead center of the expansion stroke cylinder, it is conceived that the piston cannot sufficiently compress intake air by reverse rotation thereafter. Accordingly, at this time, it can also be determined that the cylinder pressure at the time point of firing of an air-fuel mixture is not equal to or greater than the predetermined pressure.

When the crank shaft rotates reversely in this way, the crank angular velocity increases for a moment from the start of reverse rotation, and the crank angular velocity decreases due to application of the cylinder pressure to the piston after the crank angular velocity reaches the maximum value. Therefore, it can be determined whether the piston is returned to the predetermined range in the vicinity of the top dead center based on changes in the crank angle position and the crank angular velocity, and it can also be determined that the cylinder pressure at the time point of firing of an air-fuel mixture is not equal to or greater than the predetermined pressure when it is determined that the piston is not returned to the predetermined range.

After the crank angular velocity decreases in this way, the crank shaft ends its reverse rotation, stops temporarily, and then restarts forward rotation (forward re-rotation), thereby decreasing the cylinder pressure. Accordingly, when the restarting condition is satisfied after the crank shaft starts forward re-rotation, it can be determined that the cylinder pressure at the time point of firing of an air-fuel mixture decreases to be less than the predetermined pressure through a fuel injection and ignition delay time thereafter.

Here, it can be determined, for example, based on a crank signal whether the crank shaft starts the forward re-rotation. However, in general, since a crank signal is generated for every predetermined crank angle (for example, 5° to 10° CA) depending on a resolution of the crank angle sensor, the determination may be delayed due to a slight input delay of the crank signal when the crank shaft is switched from reverse rotation to forward re-rotation as described above.

Therefore, when a slight input delay of the crank signal is generated during reverse rotation, that is, when a period in which a change in crank angle position due to the reverse rotation is less than a predetermined width (for example, the predetermined crank angle) increases to be equal to or greater than a preset time, it is estimated that the crank shaft is switched to forward re-rotation and it can be determined that the cylinder pressure at the time point of firing of an air-fuel mixture is not equal to or greater than the predetermined pressure even when the restarting condition is satisfied thereafter.

Whether the cylinder pressure of the expansion stroke cylinder increases due to the reverse rotation of the crank shaft also depends on an amount of intake air which is filled in the cylinder in an intake stroke. When the engine stops automatically, a throttle valve is not fully closed but is opened within a range in which vibration does not increase to secure an amount of intake air in preparation of later autonomous starting, but the cylinder may not be filled with sufficient intake air.

Therefore, when an intake air pressure (a pressure of an intake air passage) at a time at which the intake valve of the expansion stroke cylinder is closed while the engine is stopping is equal to or less than a predetermined value, it is conceived that an amount of intake air filled in the cylinder is not sufficient and thus it may also be determined that the cylinder pressure at the time point of firing of an air-fuel mixture is not equal to or greater than the predetermined pressure in this case. In other words, an intake air pressure with which an increase in the cylinder pressure is hindered can be acquired in advance by experiment or the like and may be set as the predetermined value.

Whether a power of the reverse rotation of the crank shaft is not sufficient as described above and the cylinder pressure is not satisfactorily increased may be determined based on the crank angular velocity (which may be an engine rotation speed) at the top dead center which is last overtaken immediately before the reverse rotation. In this case, when the crank angular velocity at the top dead center which is last overtaken is equal to or less than a predetermined value, it can be determined that the power of the reverse rotation of the crank shaft is not sufficient and the cylinder pressure at the time point of firing of an air-fuel mixture is not equal to greater than the predetermined pressure.

The rotation of the crank shaft may stop after the reverse rotation or the forward re-rotation or the rotation of the crank shaft may stop without performing the reverse rotation or the like. However, when a predetermined time elapses thereafter, intake air leaks from the expansion stroke cylinder and the cylinder pressure thereof decreases. Accordingly, when the restarting condition is satisfied thereafter, it may be determined that the cylinder pressure of the expansion stroke cylinder is not equal to or greater than the predetermined pressure even if fuel injection or ignition is performed.

The cylinder pressure at the time point of firing of an air-fuel mixture can be determined from various points of view as described above, and the autonomous starting control is prohibited by the ECU when it is considered that the cylinder pressure is not excessively high and the autonomous starting is difficult. In this case, the ECU may be configured to activate the starter motor and to perform fuel injection and ignition in a cylinder in a compression stroke to start the engine.

According to the above-mentioned starting control device for an engine according to the disclosure, the engine is autonomously started when a restarting condition is satisfied while the engine is stopping and it is determined that an air-fuel mixture is fired in a state in which a cylinder pressure of an expansion stroke cylinder has increased to be equal to or greater than a predetermined value due to reverse rotation of a crank shaft, and autonomous starting of the engine is prohibited otherwise. Accordingly, when autonomous starting is likely to fail, the autonomous starting can be rapidly switched to starting using a starter motor and thus it is possible to prevent a driver from having a feeling of slowness.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings. In this embodiment, for example, it is assumed that the disclosure is applied to a gasoline engine mounted in a vehicle.

—Outline of Engine—

Figure 1:
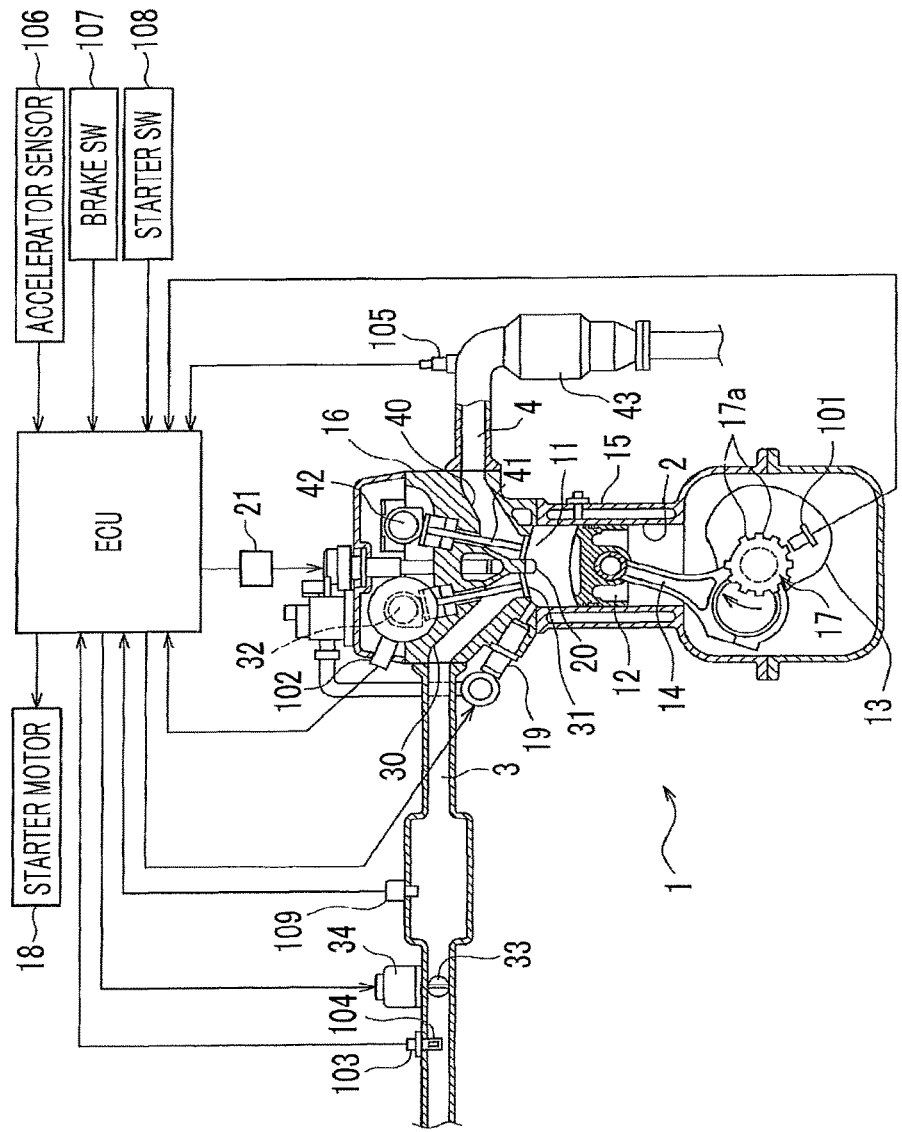
FIG. 1 is a diagram schematically illustrating a configuration of an engine according to an embodiment.

A schematic configuration of an engine 1 is illustrated in FIG. 1, but the engine 1 according to this embodiment is a four-cylinder gasoline engine, and a piston 12 is accommodated in each of first to fourth cylinders 2 (only one thereof is illustrated in the drawing) to define a combustion chamber 11. The piston 12 and a crank shaft 13 are connected by a connecting rod 14, and a crank angle sensor 101 that detects a rotational angle (a crank angle) of the crank shaft 13 is provided.

Specifically, a signal rotor 17 is attached to the crank shaft 13, and a plurality of teeth 17a are formed on an outer circumferential surface thereof. On the other hand, the crank angle sensor 101 includes, for example, two electromagnetic pickups, and a pulse signal is output from each electromagnetic pickup whenever the tooth 17a of the signal rotor 17 passes with rotation of the crank shaft 13.

A signal output from one of the two electromagnetic pickups is a crank signal indicating a change in a crank angle position, and a signal output from the other has a predetermined phase difference from the crank signal. Accordingly, it is possible to determine whether the crank shaft 13 rotates forward or not (rotates reversely) depending on whether the signal output from the other electromagnetic pickup at the time of rising or falling of the crank signal is low or high.

Although not illustrated in the drawing, a flywheel is attached to an end of the crank shaft 13 to rotate integrally, and a starter motor 18 (which is schematically illustrated in FIG. 1) is disposed such that a pinion gear engages with a ring gear formed on an outer circumference thereof to rotate. The starter motor 18 is activated in response to a signal from an ECU 100 as will be described later when the engine 1 performs a normal operation.

A cylinder head 16 is placed in an upper part of a cylinder block 15, and an injector 19 is disposed for each cylinder 2 to face a combustion chamber 11. For example, fuel injected from the injector 19 in an intake stroke of each cylinder 2 forms an air-fuel mixture while diffusing on a flow of intake air in the cylinder 2. In order to ignite the air-fuel mixture formed in this way, an ignition plug 20 is also disposed in the cylinder head 16 and performs spark discharge with supply of electric power from the igniter 21.

An intake port 30 and an exhaust port 40 are formed in the cylinder head 16 to communicate with the combustion chamber 11 of each cylinder 2, and an opening facing the inside of each cylinder 2 is opened and closed by an intake valve 31 and an exhaust valve 41. A valve train activating the intake valve 31 and the exhaust valve 41 includes two cam shafts 32 and 42 for intake and exhaust and rotates by the crank shaft 13 via a timing chain and a sprocket which are not illustrated.

A cam angle sensor 102 is disposed in the vicinity of the intake cam shaft 32 to output a pulse signal (hereinafter referred to as a cam signal) when a certain cylinder 2 is at a predetermined crank angle position (for example, the first cylinder 2 is at a top dead center). Since the intake cam shaft 32 rotates at half a speed of the crank shaft 13, the cam angle sensor 102 outputs a cam signal at least once whenever the crank shaft 13 rotates twice (a change of 720° in crank angle).

In an intake air passage 3 communicating with an upstream side (an upstream side of an intake air flow) of the intake port 30, an airflow meter 103, an intake air temperature sensor 104 (which is built in the airflow meter 103), and an electromagnetic-control throttle valve 33 are disposed, and an intake air pressure sensor 109 is disposed downstream from the throttle valve 33. The throttle valve 33 is driven by a throttle motor 34, and narrows a flow of intake air to adjust an amount of intake air in the engine 1.

A flow of intake air of which a flow rate has been adjusted by the throttle valve 33 flows from the intake port 30 to each cylinder 2 and is mixed with fuel injected from the injector 19 to form an air-fuel mixture. The air-fuel mixture is ignited by the ignition plug 20 and is combusted, and resultant gas generated thereby flows to the exhaust port 40 in an exhaust stroke of the cylinder 2. In an exhaust gas passage 4 communicating with a downstream side (a downstream side in an exhaust gas flow) of the exhaust port 40, a catalyst 43 for exhaust emission control is disposed and an air-fuel ratio sensor 105 is disposed upstream therefrom.

—ECU—

The engine 1 having the above-mentioned configuration is controlled by an ECU 100. The ECU 100 is constituted by a known electronic control unit and includes a central processing unit (CPU), a read only memory (ROM), a random access memory (RAM), and a backup RAM, all of which are not illustrated. The CPU performs various operation processes based on a control program or a map stored in the ROM. The RAM temporarily stores operation results from the CPU, data input from various sensors, and the like and the backup RAM stores, for example, data which should be stored when the engine 1 stops.

In addition to the crank angle sensor 101, the cam angle sensor 102, the airflow meter 103, the intake air temperature sensor 104, the air-fuel ratio sensor 105, and the intake air pressure sensor 109, an accelerator sensor 106 that detects an amount of depression of an accelerator pedal (an acceleration depression amount), a brake switch (a brake SW) 107 that detects an operation of a brake pedal, and a starter switch (a starter SW) 108 that activates the starter motor 18 are connected to the ECU 100.

The ECU 100 controls an operating state of the engine 1 by executing various control programs based on signals input from various sensors and switches 101 to 109. For example, the ECU 100 performs control of fuel injection from the injector 19 (control of an amount of injected fuel and an injection time), control of ignition using the igniter 21 (control of an ignition time by the ignition plug 20), and control of a throttle opening level using the throttle motor 34 (that is, control of an amount of intake air).

Figure 2:
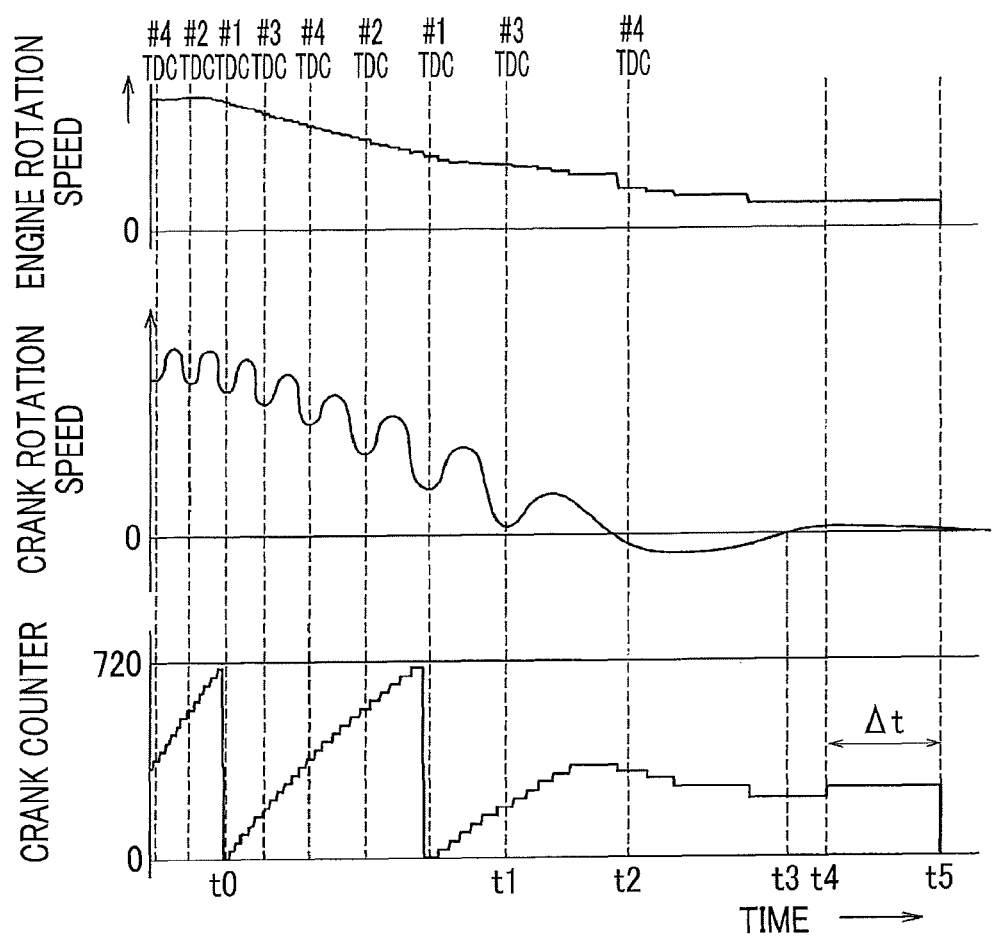
FIG. 2 is a timing chart illustrating an example of changes in an engine rotation speed, a crank rotation speed, and a crank counter when an engine stops.

Such control of fuel injection or ignition is performed at a time suitable for each cylinder 2 and thus a crank counter with two rotations of the crank shaft 13 (720° in crank angle) as one cycle is generated. The crank counter of which an example is illustrated in FIG. 2 is generated with respect to a top dead center of the first cylinder 2 (#1 TDC) and is reset in response to input of a cam signal at time t0 as illustrated in the lower part of FIG. 2, and the count value becomes zero (0) and then increases in response to input of a crank signal.

When the starter SW 108 is turned on, the ECU 100 activates the starter motor 18, rotates (cranks) the crank shaft 13, and performs control of fuel injection and ignition at the time of starting to start the engine 1 (normal starting). In addition, as will be described below, the ECU 100 automatically stops the engine 1 in a predetermined situation such as a situation in which a vehicle stops and performs idle reduction control of starting the engine 1 (hereinafter also referred to as autonomous starting) without using the starter motor 18 in response to a later predetermined operation of a driver.

Figure 3:
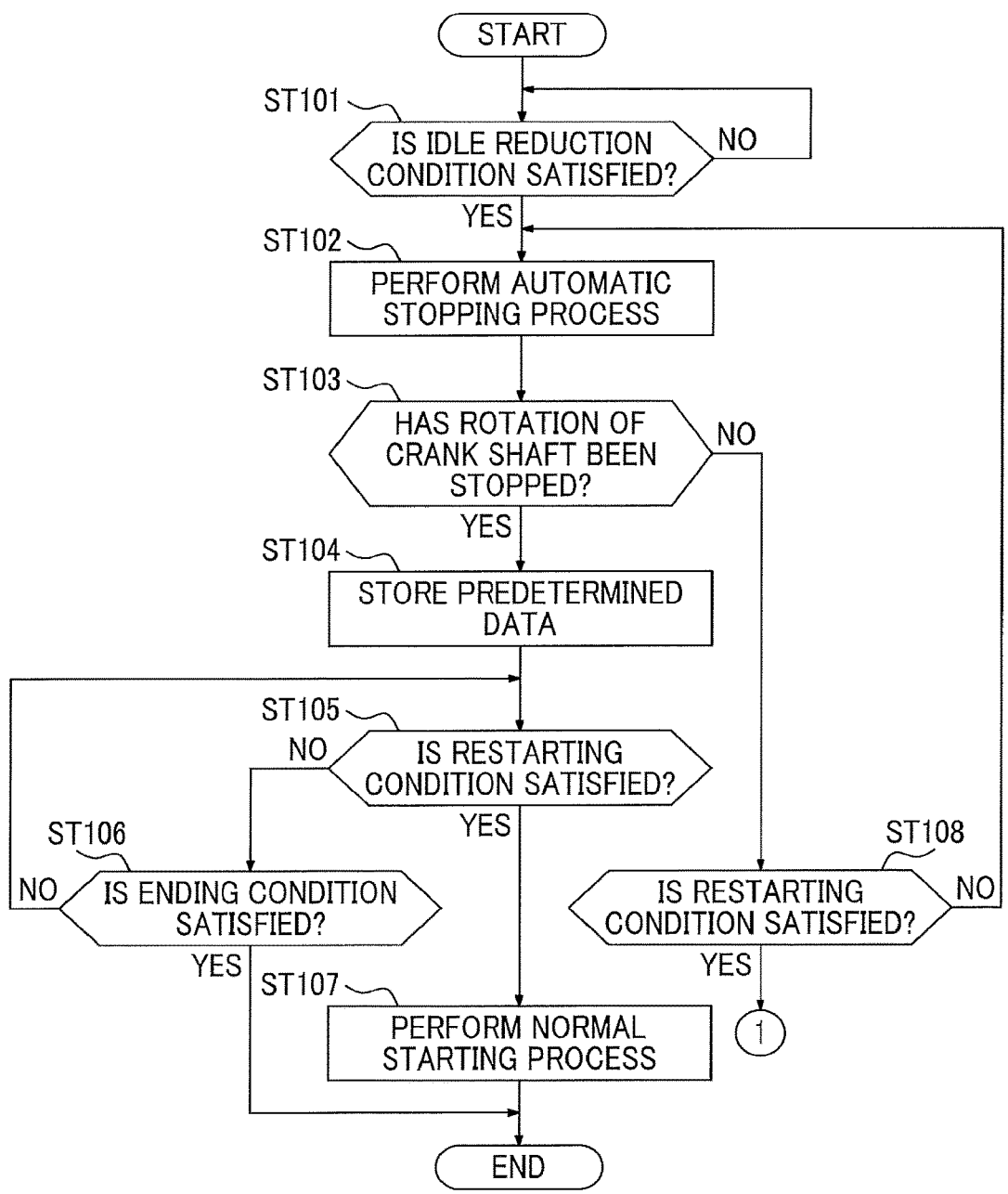
FIG. 3 is a flowchart illustrating an idle reduction control routine according to the embodiment.

FIG. 3 illustrates an entire process flow of an idle reduction control routine. This routine is repeatedly performed at predetermined time intervals by the ECU 100. First, in Step ST101, it is determined whether a predetermined idle reduction condition is satisfied during operation of the engine 1. The routine restarts when the determination result is negative (NO) and a process of automatically stopping the engine 1 is performed in Step ST102 when the determination result is positive (YES).

For example, the idle reduction condition can be set to include a condition that the engine 1 is operating, a condition that an accelerator pedal is turned off (the accelerator depression amount is equal to or less than a predetermined threshold value and is close to almost 0), and a condition that a vehicle speed is equal to or less than a predetermined threshold value (which includes a case in which the vehicle is considered to almost stop and a case in which the vehicle is considered to substantially stop).

When fuel injection from the injector 19 and ignition using the ignition plug 20 are stopped by the automatic stopping process of Step ST102, a rotation speed of the crank shaft 13 (which is a crank angular velocity and is hereinafter also referred to as a crank rotation speed) decreases as illustrated in FIG. 2. At this time, the throttle valve 33 is controlled, for example, to correspond to idling or to be less opened and thus guaranteeing of an amount of intake air for restarting and reduction of vibration are achieved.

In Step ST103, it is determined whether rotation of the crank shaft 13 stops as will be described below in detail. When the determination result is negative (NO), it is determined in Step ST108 whether a predetermined restarting condition is satisfied. Here, the routine returns to Step ST102 when the determination result is negative (NO), and control of autonomous starting of the engine 1 or the like is performed as will be described later with reference to FIGS. 4 and 5 and the like when the determination result is positive (YES).

On the other hand, when it is determines in Step ST103 that rotation of the crank shaft 13 stops (YES), the ECU 100 stores predetermined data in the backup RAM and waits for satisfaction of the restarting condition in Step ST104. That is, it is determined in Step ST105 whether the restarting condition of the engine 1 is satisfied, and the routine transitions to Step 5106 when the determination result is negative (NO).

In Step ST106, it is determined whether an ending condition of the idle reduction control is satisfied such as whether an ignition switch of the vehicle is turned off. The routine is ended (END) when the determination result is positive (YES), and the routine returns to Step ST105 when the determination result is negative (NO). That is, the routine waits until the restarting condition of the engine 1 is satisfied or the ending condition of the idle reduction control is satisfied.

For example, when a depressing force of a brake pedal is weakened and the restarting condition is satisfied during the waiting, the determination result of Step ST105 is positive (YES) and a normal restarting process of the engine 1 is performed in Step ST107. In addition to the condition that the brake pedal is operated, for example, the restarting condition can be set to include a condition that an accelerator pedal is depressed and a condition that a predetermined operation is performed on a shift lever.

Although the normal restarting process will not be described in details, for example, the starter motor 18 is activated to start cranking, injection of fuel using the injector 19 is started, and ignition using the ignition plug 20 is also started. Accordingly, combustion is started in any one cylinder 2 (initial explosion) and the engine rotation speed increases to a predetermined value (completion of starting), the routine ends (END).

—Stop Determination of Engine—

Determination of rotation stop of the crank shaft 13 in Step ST103 of the above-mentioned process flow will be described below in detail. First, when the engine 1 stops, the engine rotation speed decreases as illustrated in the upper part of FIG. 2. However, at this time, the crank rotation speed also decreases as a whole as illustrated in the middle part of the drawing. Since intervals at which a crank signal is input are elongated, the slope of the graph of the crank counter gradually decreases as in the lower part of the drawing.

The rotation speed of the crank shaft 13 while the engine 1 is stopping decreases due to the cylinder pressure (a compressive reaction force applied to the piston 12) increasing in a compression stroke for each cylinder 2, and the crank rotation speed decreases toward the top dead center (TDC) as illustrated in the middle part of the drawing. On the other hand, when the cylinder overtakes the top dead center and transitions to an expansion stroke, the rotation speed of the crank shaft 13 increases due to the cylinder pressure, and thus the rotation speed increases.

That is, the crank rotation speed repeats a decrease and an increase before and after the top dead centers (#1 TDC, #3 TDC, #4 TDC, . . . ) of the cylinders 2 and decreases slowly as a whole. Accordingly, a power of rotation decreases and, in the illustrated example, the crank rotation speed overtakes the top dead center (#3 TDC) of the third cylinder 2 at time t1 and then cannot overtake the top dead center (#4 TDC) against the cylinder pressure of the fourth cylinder 2 at time t3.

Accordingly, the crank shaft 13 stops completely through a rebounding period in which the crank shaft 13 stops temporarily before the top dead center of the fourth cylinder 2, then rotates reversely, and then rotates slightly forward again (rotates at a regeneration point). At this time, the crank counter decreases in response to a crank signal after the crank shaft 13 rotates reversely slightly prior to time t2, and the crank counter increases again at time t4 when the forward rotation is excited at time t3.

When an angle by which the crank shaft 13 rotates decreases until the crank shaft stops through the rebounding period, a crank signal is not output from the crank angle sensor 101. When the period in which a crank signal is not input like times t4 to t5 is a predetermined time Δt (at time t5), it is determined that rotation of the crank shaft 13 is stopped (that is, the engine 1 stops completely).

—Autonomous Starting of Engine—

Autonomous starting of the engine 1 when the restarting condition is satisfied in Step ST108 in the process flow illustrated in FIG. 3 will be described below in detail. First, when a driver intends to stop a vehicle, the engine 1 generally stops automatically by the idle reduction control as described above, and the driver may start the engine 1 due to the driver's change of mind (COM) before the engine 1 stops completely.

At this time, for example, since the driver detaches a foot from the brake pedal and depresses an accelerator pedal, the restarting condition of the engine 1 is satisfied (YES in Step ST108) and thus fuel injection and ignition in a cylinder 2 in an intake stroke or a compression stroke is restarted. By combustion of an air-fuel mixture in the cylinder 2, a rotational force (a combustion torque) can be applied to the crank shaft 13 and thus the engine 1 can be started without using the starter motor 18.

That is, for example, when the restarting condition is satisfied in a state in which the engine rotation speed is high to a certain extent as in the period between times t0 to t1 described above with reference to FIG. 2 and the power of rotation of the crank shaft 13 is strong, that is, in a state in which the kinetic energy of a rotating part such as the crank shaft 13 or a flywheel is strong, fuel is injected, for example, from the injector 19 in the cylinder 2 in the compression stroke, formation of an air-fuel mixture is awaited, and ignition can be performed using the ignition plug 20 in the vicinity of the top dead center.

At the end of the period between times t0 to t1, since the engine rotation speed is considerably low, the cylinder 2 in the compression stroke cannot be said to overtake the top dead center (the top dead center #3 TDC of the third cylinder 2 in FIG. 2). Therefore, after the third cylinder 2 overtakes the top dead center (#3 TDC) and transitions to the expansion stroke, fuel is injected from the injector 19 and an air-fuel mixture which is formed as a whole is ignited. Accordingly, it is possible to more satisfactorily acquire a combustion torque in a forward rotating direction and to start the engine 1.

On the other hand, for example, when the restarting condition is satisfied after time t1, the engine rotation speed is excessively low and the fourth cylinder 2 which is in the compression stroke at that time cannot overtake the top dead center (#4 TDC). In this case, since the crank shaft 13 stops temporarily before the top dead center and then rotates reversely as described above, the piston 12 of the fourth cylinder 2 in the compression stroke stops temporarily before the top dead center (at time t1 in FIG. 4) and then starts falling as indicated by a graph of a dotted line in the upper part of FIG. 4.

At this time, the piston 12 of the third cylinder 2 in the expansion stroke stops temporarily before a bottom dead center (BDC) and then rises by later reverse rotation of the crank shaft 13 as indicated by a graph of a solid line in the drawing. Therefore, when the piston 12 returns to the predetermined range A (for example, about ATDC 0° CA to 50° CA) in the vicinity of the top dead center by the reverse rotation and the cylinder pressure is sufficiently high, the injector 19 of the third cylinder 2 is activated to inject fuel (at time t2 in FIG. 4).

Figure 4:
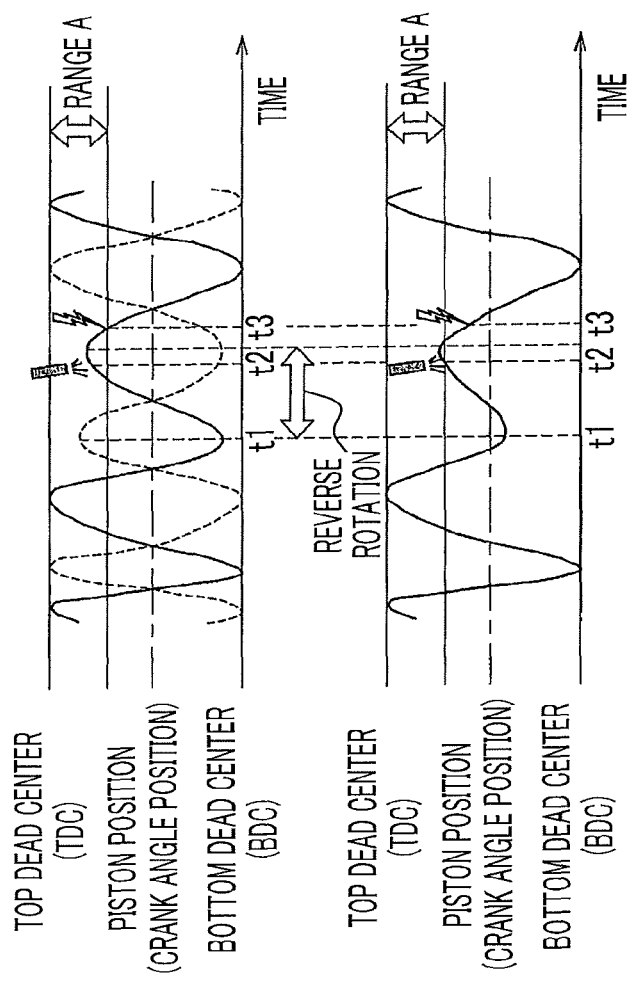
FIG. 4 is a timing chart illustrating an example of changes in a piston position immediately before rotation of a crank shaft stops.

Formation of an air-fuel mixture in the third cylinder 2 by the injection of fuel is awaited, that is, elapse of a predetermined ignition delay time is awaited, and then the air-fuel mixture is ignited using the ignition plug 20 of the third cylinder 2 to combust the air-fuel mixture (at time t3 in FIG. 4). Accordingly, in addition to the cylinder pressure of the third cylinder 2 in the expansion stroke, that is, the compressive reaction force, a pressure based on combustion of the air-fuel mixture acts on the piston 12 and is converted into a rotational force of the crank shaft 13.

That is, since the compressive reaction force and the combustion torque increase as the piston 12 of the cylinder 2 in the expansion stroke (hereinafter simply referred to as an expansion stroke cylinder 2) gets close to the top dead center by the reverse rotation of the crank shaft 13, a relationship between the crank angle position and the magnitudes of the compressive reaction force and the combustion torque is acquired in advance by experiment or the like and the predetermined range A in which a torque sufficient for starting is acquired is set. Then, when the piston returns to the predetermined range A, fuel is injected.

A position at which the piston 12 of the expansion stroke cylinder 2 gets close to a top dead center by the reverse rotation of the crank shaft 13 and stops temporarily as described above varies. This is mainly based on a variation in kinetic energy of the crank shaft 13 or the like and a variation in an amount of intake air filled in the cylinder 2, and is also based on a variation in friction of the engine 1. Accordingly, even when fuel is injected and an air-fuel mixture is ignited as described above, a sufficient torque may not be acquired and autonomous starting may fail.

That is, a standby time (an ignition delay time) for forming an air-fuel mixture is required until the air-fuel mixture is ignited after fuel is injected into the expansion stroke cylinder 2 as described above, and there is also a delay until the ignited air-fuel mixture is fired. Accordingly, as indicated by a graph of a solid line in the lower part of FIG. 4, even if fuel is injected when the piston 12 returns to a predetermined range A, the crank shaft 13 may rotate forward again until the air-fuel mixture is fired thereafter and thus departs from the predetermined range A.

When the air-fuel mixture is fired outside the predetermined range A in this way, the autonomous starting may fail for the above-mentioned reason. In this case, the autonomous starting is switched to starting using the starter motor 18 (starter starting). However, in this case, for example, since rotation of the crank shaft 13 stops completely, it is determined that starting fails, and then the starter motor 18 is activated, there is concern that a driver will have a feeling of slowness in restarting.

Therefore, in this embodiment, paying attention to an increase in cylinder pressure in the expansion stroke cylinder 2 when the crank shaft 13 rotates reversely as described above, it is predicted (determined) whether an air-fuel mixture is fired in a state the cylinder pressure is higher than a predetermined pressure. The autonomous starting control is performed when the air-fuel mixture is fired in a state in which the cylinder pressure is high, and the autonomous starting is prohibited and rapidly switched to starting using a starter otherwise. A routine of starting control will be specifically described below with reference to the flowchart illustrated in FIG. 5.

—Autonomous Starting Routine—

Figure 5:
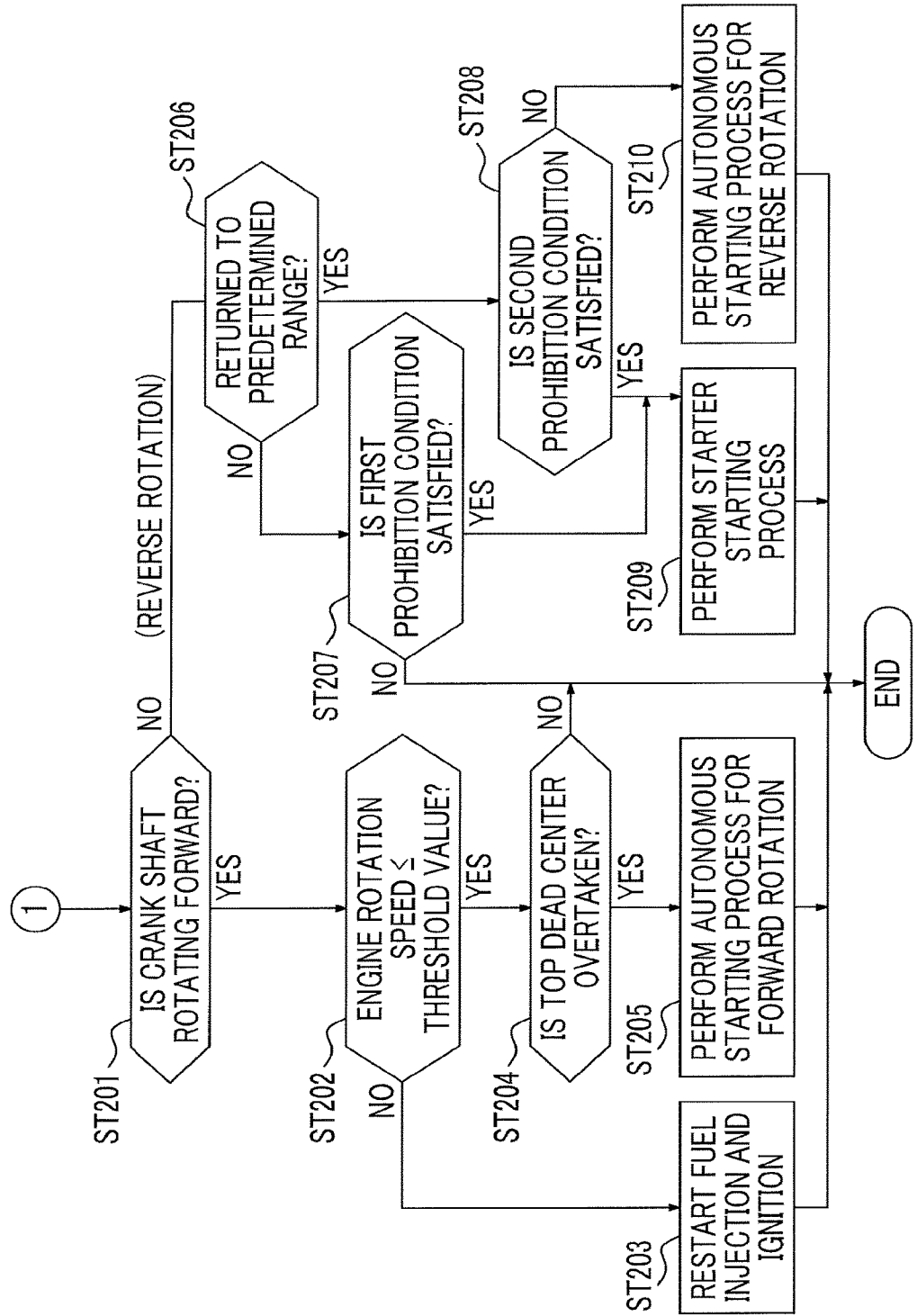
FIG. 5 is a flowchart illustrating an autonomous starting control routine according to the embodiment.

The starting control routine illustrated in FIG. 5 is started when the restarting condition is satisfied in Step ST108 of FIG. 3. First, in Step 5201, it is determined whether the crank shaft 13 is rotating forward before rotating reversely. This determination can be performed based on a change of a value of the crank counter, that is, the crank signal input from the crank angle sensor 101 as described with reference to FIG. 2.

The routine transitions to Step ST206 when the determination result is negative (NO) and, when the determination result is positive (YES), it is determined in Step ST202 whether the engine rotation speed is equal to or less than a predetermined threshold value and there is a likelihood that a next top dead center will not be overtaken. The threshold value can be set to an engine rotation speed at which a next top dead center will be overtaken by experiment in advance in consideration of kinetic energy of a rotating part such as the crank shaft 13, the cylinder pressure or friction of the cylinders 2, and the like.

When the determination result of Step ST202 is negative (NO), fuel injection and ignition is restarted sequentially from the cylinder 2 having a next top dead center in Step ST203 and then the routine ends (END). On the other hand, when the engine rotation speed is equal to or less than a threshold value and the determination result is positive (YES), there is a likelihood that a next top dead center will not be overtaken and thus it is determined in Step ST204 whether the cylinder 2 in the compression stroke actually overtakes the top dead center. When the determination result is negative (NO), the routine ends temporarily (END). Thereafter, when the cylinder 2 in the compression stroke overtakes the top dead center and the determination result of Step ST204 is positive (YES), control of fuel injection and ignition for autonomous starting in forward rotation is performed in Step ST205. That is, first, an amount of intake air in the cylinder (the expansion stroke cylinder) 2 which has overtaken the top dead center and transitioned to the expansion stroke is calculated and fuel is injected to the intake air using the injector 19 of the expansion stroke cylinder 2 such that a target air-fuel ratio (which is preferably richer than a theoretical air-fuel ratio) is obtained.

Thereafter, by supplying power to the ignition plug 20 to ignite the air-fuel mixture after waiting for elapse of a predetermined ignition delay time (for example, about several tens of milliseconds), rotation (forward rotation) of the crank shaft 13 is assisted, fuel injection and ignition are restarted sequentially from the cylinder 2 having a next top dead center, and then the routine ends (END). The ignition delay time corresponds to a time until injected fuel is vaporized to form an air-fuel mixture and is set in advance by experiment or the like.

On the other hand, in Step ST206 to which the routine transitions when the determination result of Step ST201 is negative (NO), that is, when it is determined that the crank shaft 13 rotates reversely, it is determined whether the expansion stroke cylinder 2 returns to the predetermined range A (see FIG. 4) in the vicinity of the top dead center by the reverse rotation. The routine transitions to Step ST208 when it is determined the expansion stroke cylinder returns to the predetermined range A (YES), and the routine transitions to Step ST207 when it is determined that the expansion stroke cylinder does not return to the predetermined range A (NO).

That is, as described above with reference to FIG. 2, the crank shaft 13 stops temporarily before the top dead center and then rotates reversely with the cylinder pressure of the cylinder 2 in the compression stroke. Accordingly, since the piston 12 rise to the top dead center in the expansion stroke cylinder 2, whether the piston 12 returns to the predetermined range A in the vicinity of the top dead center can be determined depending on a change of a crank signal.

Figure 6:
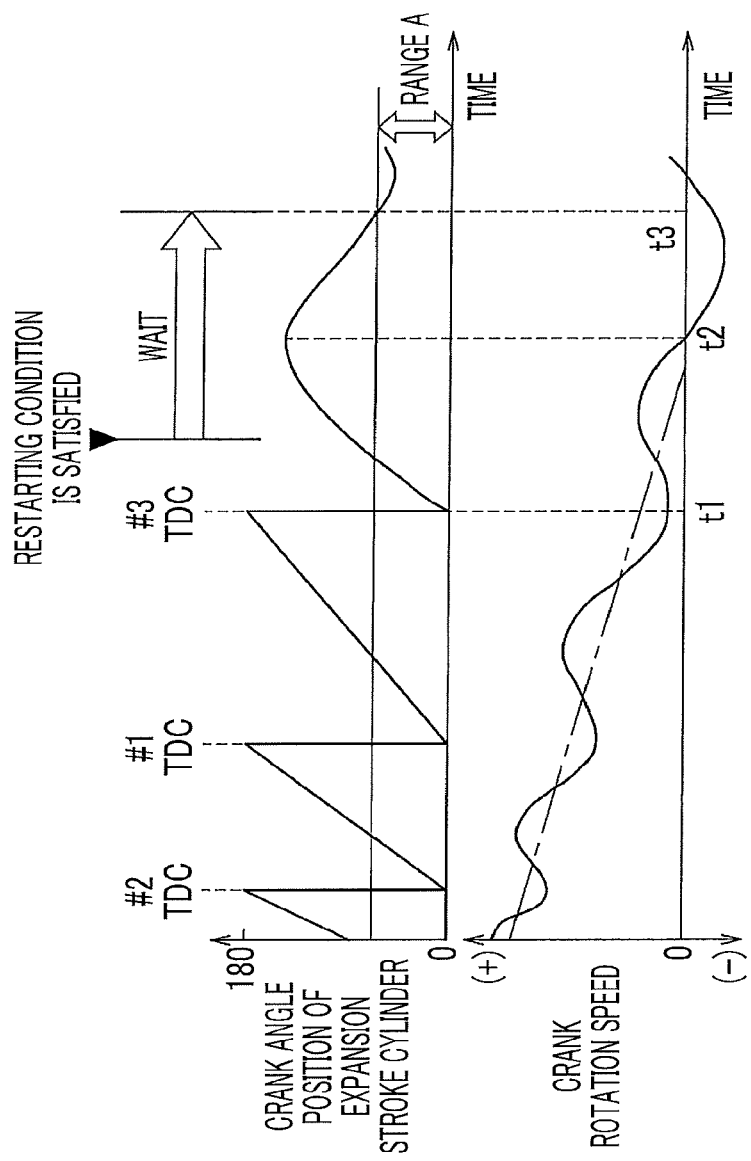
FIG. 6 is a timing chart illustrating changes in a crank angle position and a crank rotation speed due to reverse rotation of the crank shaft.

Specifically, a change of the crank angle position in the expansion stroke of each cylinder 2 immediately before the engine 1 stops is illustrated in FIG. 6. First, when the crank shaft 13 is rotating forward, the crank angle positions of the cylinders 2 which overtake the top dead centers (for example, #2 TDC, #1 TDC, #3 TDC, . . . ) and transitions to the expansion stroke change from 0° CA (the top dead center) to 180° CA (the bottom dead center). When an interval at which a crank signal is input extends with a decrease in the crank rotation speed, the slope of a graph indicating a change in the crank angle position decreases slowly (to time t1).

When each cylinder 2 overtakes the top dead center, the crank rotation speed decreases temporarily and then increases, the crank rotation speed decreases slowly as a whole as indicated by a one-dot chain line in the drawing, and the kinetic energy of the crank shaft 13 or the like decreases. In the cylinder 2 (the fourth cylinder 2 in the example illustrated in the drawing) which overtakes the last top dead center (#3 TDC in the example illustrated in FIG. 6) and transitions to the expansion stroke at time t1, the crank shaft 13 stops temporarily before the bottom dead center (time t2) and then starts reverse rotation.

The piston 12 in the expansion stroke cylinder 2 (the fourth cylinder 2 in the example illustrated in the drawing) rises to the top dead center by the reverse rotation of the crank shaft 13, and the crank angle position of the expansion stroke cylinder 2 changes to 0° CA (to the downside in the drawing) in FIG. 6. At this time, when the crank angle position is out of the predetermined range A as illustrated in the drawing, the determination result of Step ST206 is negative (NO) and the routine transitions to Step ST207.

That is, when it is determined that the expansion stroke cylinder 2 does not return to the predetermined range A and the restarting condition is satisfied before the reverse rotation, autonomous starting is not performed and waiting is performed until the expansion stroke cylinder 2 returns to the predetermined range A (time t3). In the meantime, it is determined in Step ST207 whether a first condition for prohibiting the autonomous starting is satisfied. Examples of the first condition include the following conditions of (1) to (4).

(1) a condition that the absolute value of the crank rotation speed during reverse rotation is equal to or less than a predetermined value; (2) a condition that the expansion stroke cylinder is estimated not to return to the predetermined range A by the reverse rotation; (3) a condition that the crank rotation speed at the last top dead center before the reverse rotation is equal to or less than a predetermined rotation speed; and (4) a condition that an intake air pressure at an IVC of the expansion stroke cylinder (a time at which the intake valve 31 is closed) is equal to or less than a predetermined value.

Conditions (1) to (4) will be described below. First, when the crank shaft 13 rotates reversely as described above, the absolute value of the crank rotation speed increases by the cylinder pressure acting on the piston 12 of the cylinder 2 in the compression stroke for a short while from the start of the reverse rotation (from time t2 in FIG. 6). As indicated by a point P in FIG. 7, after the crank rotation speed reaches a peak (a maximum value of the absolute value), the cylinder pressure is applied to the piston 12 of the expansion stroke cylinder 2 and thus the absolute value of the crank rotation speed decreases.

Figure 7:
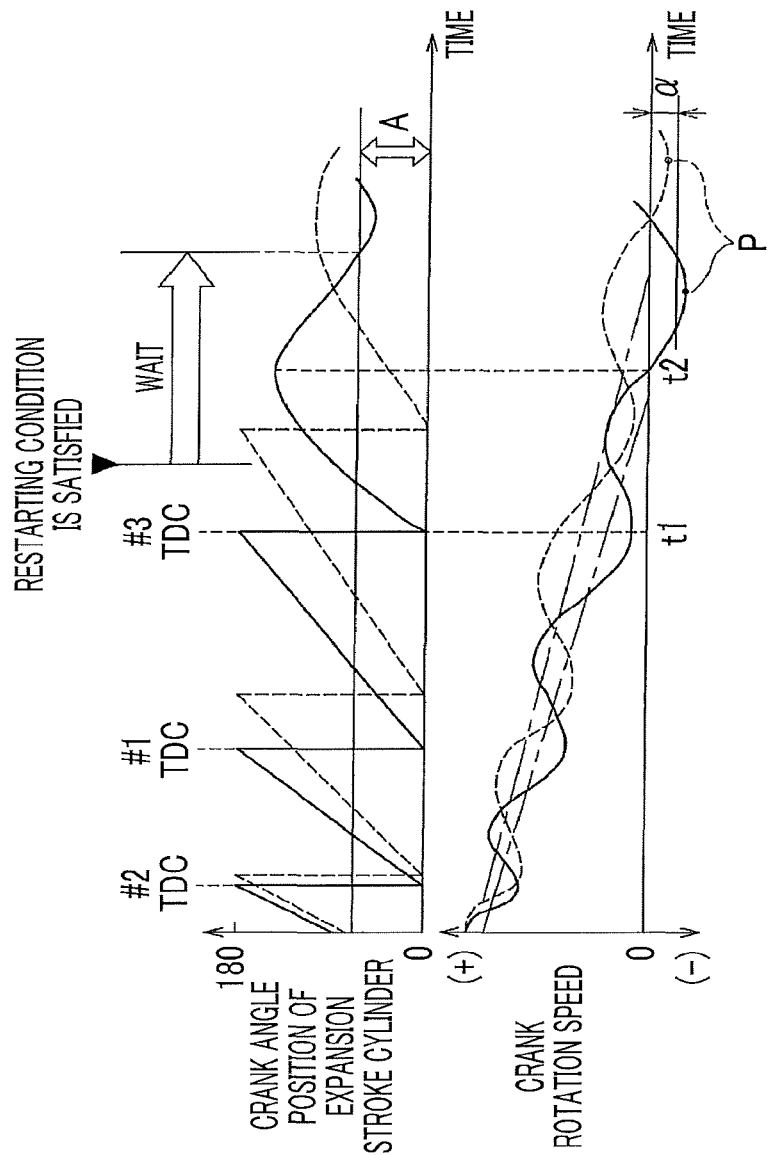
FIG. 7 is a diagram illustrating comparison of a case in which an absolute value of the crank rotation speed during reverse rotation is equal to or greater than a predetermined value and a case in which the absolute value of the crank rotation speed is less than the predetermined value and corresponding to FIG. 6.

The absolute value of the crank rotation speed which changes in this way indicates a power of reverse rotation, and when the maximum value is equal to or greater than a predetermined value α (the lower part in FIG. 7) as indicated by a graph of a solid line in FIG. 7, it is conceived that the piston 12 can sufficiently compress intake air in the expansion stroke cylinder 2 and thus the cylinder pressure is equal to or higher than a predetermined value. On the other hand, when the peak of the absolute value of the crank rotation speed is less than the predetermined value α (the upper part in FIG. 7) as indicated by a graph of a dotted line in the drawing, it is conceived that the piston 12 cannot sufficiently compress intake air.

In other words, the absolute value of the crank rotation speed is acquired in advance by experiment or the like such that the cylinder pressure at a time point at which an air-fuel mixture is ignited and fired after fuel is injected when the expansion stroke cylinder 2 returns to the predetermined range A by the reverse rotation of the crank shaft 13 is equal to or greater than a predetermined pressure, and the acquired absolute value is set as the predetermined value α. When Condition (1) is satisfied, there is a high likelihood that autonomous starting will fail, and thus the autonomous starting is prohibited.

Although not illustrated, whether the reverse rotation of the crank shaft 13 stops before returning to the predetermined range A and the cylinder cannot return to the predetermined range A, that is, Condition (2), can also be determined based on the changes of the crank angle position and the crank rotation speed in the expansion stroke cylinder 2 when the crank shaft 13 rotates reversely. For this purpose, a condition that the cylinder returns to the predetermined range A in association with the crank angle position and the crank rotation speed during the reverse rotation can be acquired in advance by experiment or the like and can be set.

Figure 8:
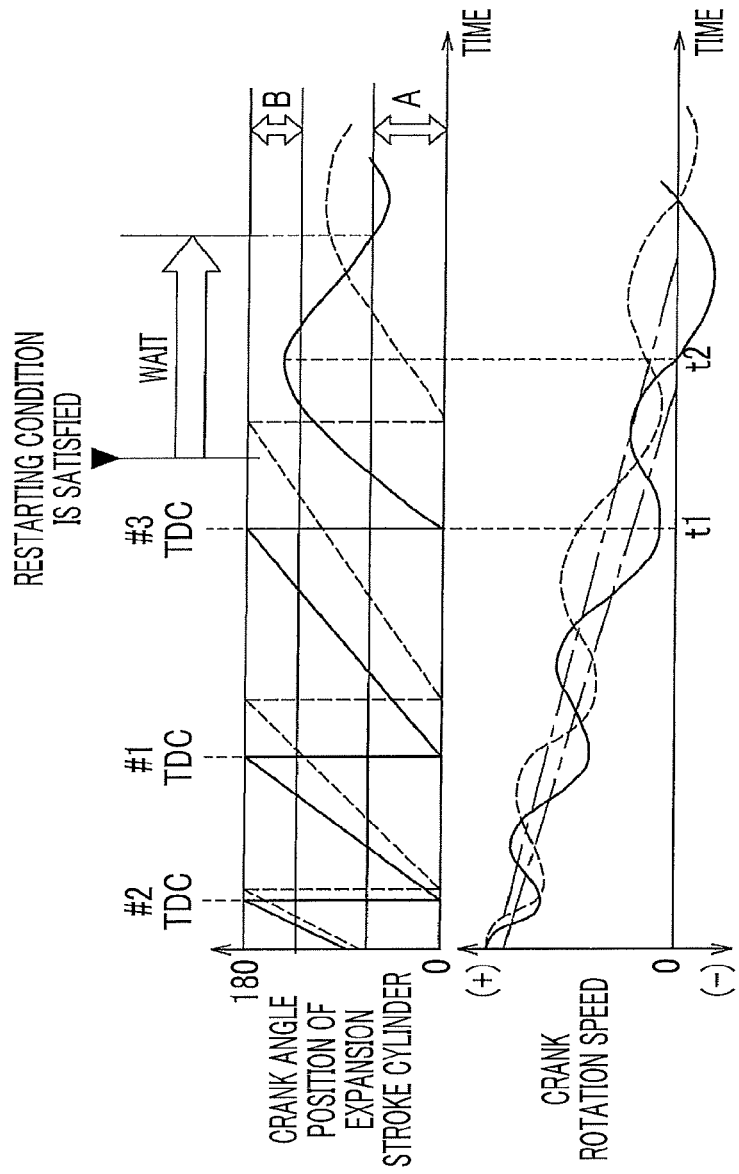
FIG. 8 is a diagram illustrating comparison of a case in which reverse rotation is started within a predetermined range in the vicinity of a bottom dead center of an expansion stroke cylinder and a case in which the reverse rotation is started outside the predetermined range and corresponding to FIG. 6.

Since the power of the rotation of the crank shaft 13 (the forward rotation in this case) is reflected in the crank angle position when the reverse rotation is started, Conditions (1) and (2) may be determined based thereon. That is, when the reverse rotation of the crank shaft 13 is started in a predetermined range B (for example, about BBDC 0° to 50° CA) in the vicinity of the bottom dead center (the upper part of the drawing) (at time t2) as indicated by a graph of a solid line in FIG. 8, it is conceived that the cylinder pressure increases sufficiently by later reverse rotation.

This is because since the cylinder 2 in the compression stroke is considerably close to the top dead center when the reverse rotation is started in the predetermined range B, the cylinder pressure (the compressive reaction force) acting on the piston 12 increases considerably and the absolute value of the crank rotation speed in the reverse rotation increases accordingly. Accordingly, it can be determined that a peak of the absolute value of the crank rotation speed is equal to or greater than the predetermined value α (see FIG. 7) and returns to the predetermined range A at a time point at which the reverse rotation ends.

On the other hand, when the reverse rotation is started outside the predetermined range B as indicated by a graph of a dotted line in the drawing, the cylinder pressure (the compressive reaction force) acting on the piston 12 of the cylinder 2 in the compression stroke decreases in comparison with a case in which the reverse rotation is started in the predetermined range B. Accordingly, the absolute value of the crank rotation speed in the reverse rotation decreases by as much and the peak of the absolute value is less than the predetermined value α or does not return to the predetermined range A. Such a predetermined range B can also be set in advance by experiment or the like.

Whether the power of the reverse rotation of the crank shaft 13 is insufficient may be determined based on the crank rotation speed or the engine rotation speed at the top dead center which has been overtaken immediately before transitioning to the reverse rotation (the last top dead center). As described above with reference to FIG. 6, the crank rotation speed (and the engine rotation speed indicated by a one-dot chain line in FIG. 6 or the like) when the last top dead center is overtaken (at time t1 in FIG. 6) indicates kinetic energy of the rotating part such as the crank shaft 13.

Accordingly, a necessary crank rotation speed (or engine rotation speed) is acquired in advance by experiment or the like such that the cylinder pressure at the time point at which an air-fuel mixture is fired is equal to or greater than a predetermined pressure as described above and the acquired crank rotation speed is set as a predetermined rotation speed. When the crank rotation speed at the last top dead center is equal to or less than the predetermined rotation speed, that is, when Condition (3) is satisfied, there is a high likelihood that autonomous starting will fail and thus the autonomous starting is prohibited.

Whether the cylinder pressure at the time point at which an air-fuel mixture is fired is equal to or greater than the predetermined pressure depends on an amount of intake air which is filled in the cylinder 2 in the intake stroke. That is, for example, as illustrated in FIG. 9, while the engine 1 is stopping, an intake air pressure in the intake air passage 3 downstream from the throttle valve 33 increases slowly (an intake negative pressure decreases) with a decrease in the crank rotation speed.

Since times at which the engine 1 stops automatically diversify, the value of the intake air pressure increasing slowly varies as described above. As a result, since the intake air pressure at a time (IVC) at which the intake valve 31 in the expansion stroke cylinder 2 (the fourth cylinder 2 in the example illustrated in the drawing) is closed varies, an amount of intake air which is filled in the expansion stroke cylinder 2 also varies.

Figure 9:
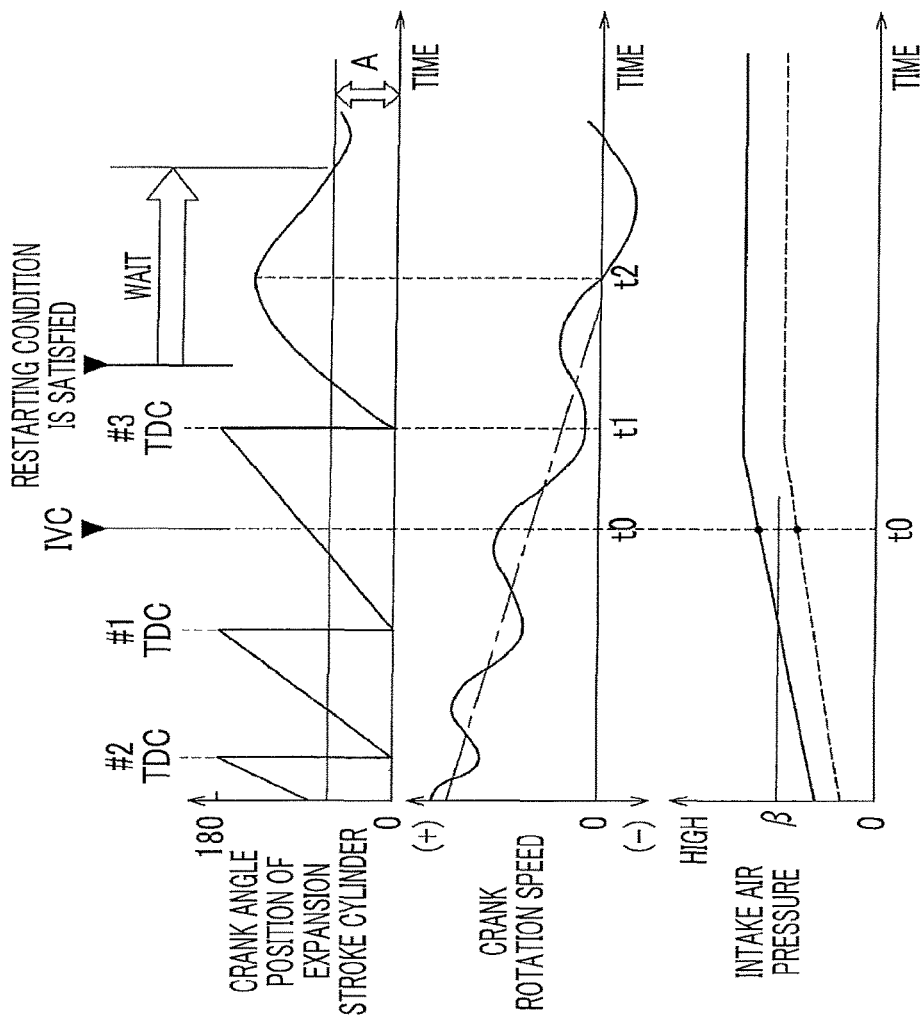
FIG. 9 is a diagram illustrating comparison of a case in which an intake air pressure in an IVC of an expansion stroke cylinder before reverse rotation is higher than a predetermined value and a case in which the intake air pressure is equal to or less than the predetermined value and corresponding to FIG. 6.

That is, when the intake air pressure at the IVC is higher than a predetermined intake air pressure β as indicated by a graph of a solid line in FIG. 9, it is conceived that an amount of intake air filled in the expansion stroke cylinder 2 is sufficiently large. Accordingly, when the cylinder returns to the predetermined range A by the reverse rotation as described above and the absolute value of the crank rotation speed during the reverse rotation is equal to or greater than a predetermined value, that is, when none of Conditions (1) and (2) is satisfied, it can be determined that the cylinder pressure at the time point at which an air-fuel mixture is fired is equal to or greater than the predetermined pressure.

On the other hand, when the intake air pressure at the IVC is equal to or less than the predetermined intake air pressure β as indicated by a graph of a dotted line in the drawing, an amount of intake air filled in the expansion stroke cylinder 2 decreases and the cylinder pressure decreases by as much. Accordingly, even when none of Conditions (1) and (2) is satisfied, it is conceived that the cylinder pressure at the time point at which an air-fuel mixture is fired is less than the predetermined pressure. Therefore, such an intake air pressure is acquired in advance by experiment and is set as the predetermined intake air pressure β and Condition (4) is determined.

When at least one of Conditions (1) to (4) is satisfied, the determination result of Step ST207 is positive (YES) and the routine transitions to Step ST209 which will be described later. When no condition is satisfied, the determination result of Step ST207 is negative (NO) and the routine ends temporarily (END). That is, when the first prohibition condition is not satisfied, autonomous starting is awaited while repeating the sequence of Steps ST201, ST206, and ST207.

When the crank angle position of the expansion stroke cylinder 2 returns to the predetermined range A while start of the autonomous starting is awaited, the determination result of Step ST206 is positive (YES), the routine transitions to Step ST208, and then a second prohibition condition of the autonomous starting is determined. The second prohibition condition refers to a condition that autonomous starting is prohibited even if the expansion stroke cylinder 2 returns to the vicinity of the top dead center, and examples thereof include the following conditions of (5) to (7).

(5) a condition that a restarting condition is satisfied after the crank shaft 13 starts forward re-rotation; (6) a condition that a restarting condition is satisfied after a period in which a crank signal is not input during reverse rotation of the crank shaft 13 is equal to or greater than a preset time; and (7) a condition that a restarting condition is satisfied after rotation of the crank shaft 13 stops for a predetermined time or more.

Conditions (5) to (7) will be described below. First, as indicated by a graph of a solid line in FIG. 10, the crank angle position of the expansion stroke cylinder 2 (the position of the piston 12) changes toward a top dead center (the lower side in the drawing) by the reverse rotation of the crank shaft 13 (from time t2 to t3) and then changes toward a bottom dead center (the upper side in the drawing) from time t3 by the forward re-rotation of the crank shaft 13.

When the crank shaft 13 starts forward re-rotation in this way, the cylinder pressure of the expansion stroke cylinder 2 decreases. Accordingly, when the restarting condition is satisfied thereafter, it is conceived that the cylinder pressure at the time point at which an air-fuel mixture is fired is less than the predetermined pressure in consideration of a time of fuel injection and ignition. Accordingly, the forward re-rotation of the crank shaft 13 is determined based on the crank signal, and when the restarting condition is satisfied thereafter, that is, when Condition (5) is satisfied, there is a high likelihood that autonomous starting will fail and thus the autonomous starting is prohibited.

The crank signal which is used to detect the change in the crank angle position is generated for every crank angle $\Delta\theta$ (for example, 5° to 10° CA) depending on a resolution of the crank angle sensor 109. Accordingly, when the reverse rotation is switched to the forward re-rotation, the crank signal is not input to the ECU 100 for a short while, but when the crank angle position changes rapidly as indicated by a graph of a solid line in FIG. 10, the period in which the crank signal is not input is short and thus there is no problem.

Figure 10:
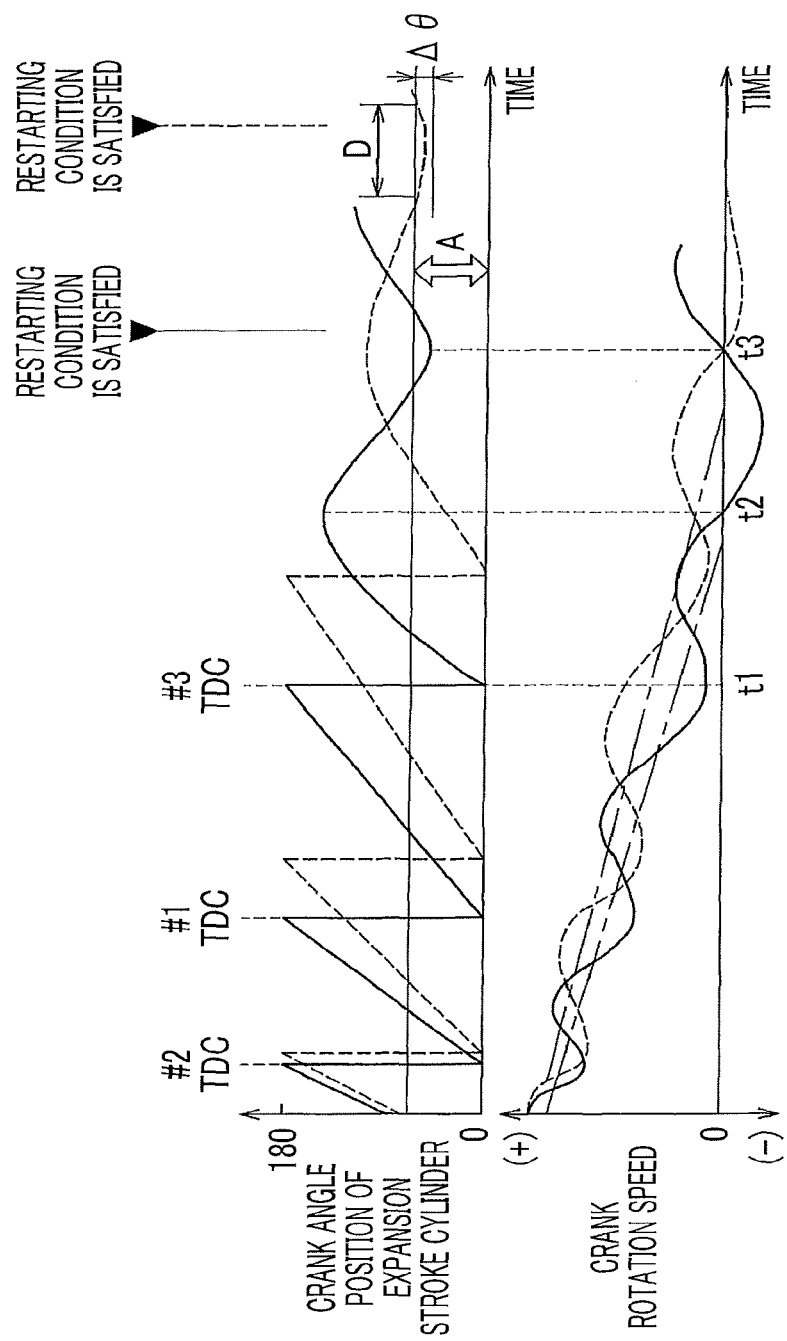
FIG. 10 is a diagram illustrating a case in which a restarting condition is satisfied after the crank shaft starts forward re-rotation and corresponding to FIG. 6.

On the other hand, when the reverse rotation of the crank shaft 13 is considerably delayed and the change of the crank angle position is delayed as indicated by a graph of a dotted line in FIG. 10, the change of the crank angle position is less than the predetermined crank angle $\Delta\theta$ and the period in which the crank signal is not input increases (the length of the period is indicated by reference sign D in FIG. 10). Accordingly, even when it is intended to determine the forward re-rotation of the crank shaft 13 based on the crank signal, there is concern that the determination will be delayed.

Therefore, when the period D in which the crank signal is not input is equal to or longer than a preset time, it is estimated that the crank shaft 13 stops temporarily and then transitions to forward re-rotation. When the restarting condition is satisfied thereafter, there is a high likelihood that autonomous starting will fail. Accordingly, when Condition (6) is satisfied, the autonomous starting is prohibited. The period D may be set to a period in which the change of the crank angle position is less than a predetermined width instead of the period in which the crank signal is not input.

Although not illustrated in the drawing, the crank shaft 13 may stop rotation without performing the forward re-rotation after performing the reverse rotation, and the crank shaft 13 may stop rotation without performing the reverse rotation. For a predetermined time after the crank shaft 13 stops rotation, oil is maintained in a gap between the expansion stroke cylinder 2 and the piston 12 and the cylinder pressure is maintained. Thereafter, the oil flows down and the cylinder pressure decreases rapidly.

That is, when the restarting condition is satisfied after a predetermined time elapses from the rotation stop of the crank shaft 13, it is conceived that the cylinder pressure at the time point at which an air-fuel mixture is fired is less than the predetermined pressure in consideration of the later time of fuel injection or ignition. Accordingly, even when the restarting condition is satisfied after the rotation of the crank shaft 13 stops for a predetermined time or more as in Condition (7), the autonomous starting is prohibited.

When at least one of Conditions (5) to (7) is satisfied, the determination result of Step ST208 is positive (YES), the starter motor 18 is activated and fuel injection and ignition in the cylinder 2 in the compression stroke is performed to start the engine (a starter starting process) in Step ST209, and then the routine ends (END). That is, when at least one of the first and second prohibition conditions is satisfied, the autonomous starting is switched to the starter starting before the autonomous starting fails.

On the other hand, when none of Conditions (5) to (7) is satisfied and the determination result of Step ST208 is negative (NO), the autonomous starting process at the time of reverse rotation is performed in Step ST210. That is, similarly to Step S205, fuel is injected using the injector 19 such that the amount of intake air in the expansion stroke cylinder 2 satisfies the target air-fuel ratio, and then electric power is supplied to the ignition plug 20 to ignite the air-fuel mixture when a predetermined ignition delay time elapses. Accordingly, after a rotational force is applied to the crank shaft 13, the fuel injection and ignition is restarted sequentially from the cylinder 2 having a next top dead center and then the routine ends (END).

By performing Step ST210 in the process flow illustrated in FIG. 5, the ECU 100 constitutes an autonomous starting control unit that injects fuel into the cylinder 2 using the injector 19 after the crank shaft 13 rotates reversely and then ignites an air-fuel mixture using the ignition plug 20 to start the engine 1 without using the starter motor 18. The autonomous starting control unit waits for start of autonomous starting until the crank angle position of the expansion stroke cylinder 2 returns to the predetermined range A in the vicinity of the top dead center by the reverse rotation (NO in Step ST206).

The ECU 100 constitutes a determination unit that determines whether the cylinder pressure increasing by the reverse rotation is equal to or greater than a predetermined pressure at a time point at which the air-fuel mixture is fired by performing Steps ST207 and ST208, and constitutes a prohibition unit that prohibits autonomous starting of the engine when it is determined that the cylinder pressure is not equal to or greater than the predetermined pressure by performing Steps ST207 and ST208 to ST209.

By performing Step ST209, the ECU 100 constitutes a starter starting control unit that activates the starter motor 18 and performs fuel injection and ignition in the cylinder 2 in the intake stroke or the compression stroke to start the engine 1 when the autonomous starting of the engine 1 is prohibited by the prohibition unit.

As described above, according to this embodiment, first, when the restarting condition is satisfied while the engine 1 is automatically stopping by idle reduction control and the cylinder 2 in the compression stroke at this time overtakes the top dead center and transitions to the expansion stroke, it is possible to apply the combustion torque to the crank shaft 13 through the fuel injection and ignition in the cylinder 2 and to smoothly autonomously start the engine 1.

That is, when fuel is injected into the cylinder 2 in the compression stroke and the crank shaft 13 rotates reversely without overtaking the top dead center of the cylinder 2, there is concern that a combustion torque in the reverse rotation direction will be generated by combustion of the air-fuel mixture. However, when the fuel injection is performed after the cylinder 2 transitions to the expansion stroke, the combustion torque in a forward rotation direction is satisfactorily acquired.

On the other hand, when the crank shaft 13 rotates reversely without overtaking the top dead center of the cylinder 2 in the compression stroke or when the restarting condition is satisfied after the crank shaft 13 starts reverse rotation, the fuel injection and ignition is performed in the expansion stroke cylinder 2 in which the piston 12 moves toward the top dead center by the reverse rotation and the combustion torque in the forward rotation direction is applied to the crank shaft 13.

At this time, paying attention to an increase of the cylinder pressure of the expansion stroke cylinder 2 due to the reverse rotation of the crank shaft 13, the engine 1 is autonomously started when it is determined that an air-fuel mixture is fired in a state in which the cylinder pressure is equal to or higher than the predetermined pressure, and the autonomous starting is prohibited when it is determined that the cylinder pressure at the time point at which an air-fuel mixture is fired is less than the predetermined pressure. Accordingly, the autonomous starting can be switched to the starter starting before the autonomous starting fails, and it is possible to prevent a driver from having a feeling of slowness.

—Other Embodiments—

The above-mentioned embodiment is only an example and does not intend to limit the configurations, applications, and the like of the disclosure. For example, in the above-mentioned embodiment, when the crank shaft 13 rotates reversely immediately before the engine 1 stops, or the like, it is determined whether the cylinder pressure at the time point at which an air-fuel mixture is fired is equal to or greater than the predetermined pressure, that is, whether the first and second prohibition conditions are satisfied, based on the crank angle position or the crank rotation speed of the expansion stroke cylinder 2, the intake air pressure before the reverse rotation, and the like, but the first and second prohibition conditions are not limited to Conditions (1) to (7).

That is, for example, one or two or three conditions of Conditions (1) to (4) may be selected as the first condition, it may be determined that the first prohibition condition is satisfied when at least one thereof is satisfied, and it may be determined that the first prohibition condition is not satisfied when none of them is satisfied. When two or three or more of Conditions (1) to (4) are satisfied, it may be determined that the first prohibition condition is satisfied.

Similarly, one or two conditions of Conditions (5) to (7) may be selected as the second condition, it may be determined that the second prohibition condition is satisfied when at least one thereof is satisfied, and it may be determined that the second prohibition condition is not satisfied when none thereof is satisfied. When two or more of Conditions (5) to (7) are satisfied, it may be determined that the second prohibition condition is satisfied.

It may not be necessary to determine (predict) whether the cylinder pressure at the time point at which an air-fuel mixture is fired is equal to or greater than the predetermined pressure based on the changes of the crank angle position or the crank rotation speed of the expansion stroke cylinder 2 and the like. That is, for example, a cylinder pressure sensor may be disposed to measure the cylinder pressure of at least one cylinder 2, the cylinder pressure at the time point at which an air-fuel mixture is fired may be estimated based on an output signal thereof, and it may be determined whether the cylinder pressure is equal to or greater than the predetermined pressure.

In the above-mentioned embodiment, the idle reduction condition is set to include a condition that the vehicle speed is equal to or less than the predetermined threshold value (which includes a case in which the vehicle is considered to almost stop and a case in which the vehicle is considered to substantially stop), but the disclosure is not limited thereto and the disclosure can be applied to a case in which the engine 1 is automatically stopped during traveling of the vehicle and then is restarted (so-called free-running control).

In the above-mentioned embodiment, the disclosure is applied to a direct-injection four-cylinder gasoline engine 1 which is mounted in a vehicle and only the injectors 19 for cylinder injection are used as injectors, but the disclosure is not limited thereto. The engine may be, for example, a three-cylinder engine, a five-cylinder engine, a six-cylinder engine, or an eight-cylinder engine, or may include injectors for port injection in addition to the injectors 19 for cylinder injection. The disclosure is not limited to the gasoline engine, but the disclosure can be applied to, for example, direct-injection alcohol engines or gas engines.

According to the disclosure, it is possible to smoothly restart an engine without using a starter motor when a restarting condition is satisfied immediately before the engine stops, and the disclosure can be effectively applied to, for example, an engine which is mounted in a vehicle.

What is clamed is:

1. A starting control device for an engine that starts a direct-injection engine by performing fuel injection and ignition in at least a cylinder in an expansion stroke when a restarting condition is satisfied immediately before the direct-injection engine stops, comprising an ECU configured to:
   i) execute an autonomous starting control in which the ECU injects fuel into the cylinder from a fuel injection valve after a crank shaft rotates reversely before the crank shaft stops its rotation and then ignites an air-fuel mixture using an ignition plug to start the engine without using a starter motor;
   ii) determine whether a pressure in the cylinder increasing due to the reverse rotation is equal to or greater than a predetermined pressure at a time point of firing of the air-fuel mixture by the ignition; and
   iii) prohibit starting of the engine under the autonomous starting control when the ECU determines that the pressure in the cylinder is not equal to or greater than the predetermined pressure.

2. The starting control device for an engine according to claim 1, wherein the ECU is configured to determine that the pressure in the cylinder is not equal to or greater than the predetermined pressure at the time point of firing of the air-fuel mixture when a maximum value of a crank angular velocity during reverse rotation is less than a predetermined value.

3. The starting control device for an engine according to claim 1, wherein the ECU is configured to determine that the pressure in the cylinder is not equal to or greater than the predetermined pressure at the time point of firing of the air-fuel mixture when a crank angle position at a start time of reverse rotation is not in a predetermined range in a vicinity of a bottom dead center.

4. The starting control device for an engine according to claim 1, wherein the ECU is configured to determine that the pressure in the cylinder is not equal to or greater than the predetermined pressure at the time point of firing of the air-fuel mixture when the ECU determines that a crank angle position is not returned to a predetermined range in a vicinity of a top dead center based on a change in crank angle position and crank angular velocity during reverse rotation.

5. The starting control device for an engine according to claim 1, wherein the ECU is configured to determine that the pressure in the cylinder is not equal to or greater than the predetermined pressure at the time point of firing of the air-fuel mixture when the restarting condition is satisfied after the crank shaft starts forward rotation again after the reverse rotation.

6. The starting control device for an engine according to claim 1, wherein the ECU is configured to determine that the pressure in the cylinder is not equal to or greater than the predetermined pressure at the time point of firing of the air-fuel mixture when the restarting condition is satisfied after a period in which a change in crank angle position after the reverse rotation is started is less than a predetermined width becomes equal to or greater than a preset time.

7. The starting control device for an engine according to claim 1, wherein the ECU is configured to determine that the pressure in the cylinder is not equal to or greater than the predetermined pressure at the time point of firing of the air-fuel mixture when an intake air pressure at a time at which an intake valve of the cylinder is closed is equal to or less than a predetermined value.

8. The starting control device for an engine according to claim 1, wherein the ECU is configured to determine that the pressure in the cylinder is not equal to or greater than the predetermined pressure at the time point of firing of the air-fuel mixture when a crank angular velocity at a top dead center overtaken immediately before the reverse rotation is started is equal to or less than a predetermined value.

9. The starting control device for an engine according to claim 1, wherein the ECU is configured to determine that the pressure in the cylinder is not equal to or greater than the predetermined pressure at the time point of firing of the air-fuel mixture when the restarting condition is satisfied after rotation of the crank shaft stops for a predetermined time or more.

10. The starting control device for an engine according to claim 1, wherein the ECU is configured to activate the starter motor and to perform fuel injection and ignition in a cylinder in a compression stroke to start the engine when the starting of the engine under the autonomous starting control is prohibited by the ECU.

* * * * *